United States Patent
Schenck

(10) Patent No.: US 6,245,236 B1
(45) Date of Patent: Jun. 12, 2001

(54) RECIPROCATING BIOLOGICAL FILTER

(75) Inventor: Robert C. Schenck, Kettering, OH (US)

(73) Assignee: Cercona of America Inc., Dayton, OH (US)

( * ) Notice: Subject to any disclaimer, the term of this patent is extended or adjusted under 35 U.S.C. 154(b) by 0 days.

(21) Appl. No.: 09/320,438

(22) Filed: May 26, 1999

(51) Int. Cl.$^7$ .............. C02F 3/08; B01D 35/00; B01D 33/35; E04H 4/12
(52) U.S. Cl. .......... 210/615; 210/619; 210/150; 210/328; 210/169
(58) Field of Search ............... 210/615, 619, 210/150, 151, 328, 169

(56) References Cited

U.S. PATENT DOCUMENTS

| | | |
|---|---|---|
| D. 324,902 * | 3/1992 | Kohler . |
| 565,858 * | 8/1896 | Fowler . |
| 798,908 | 9/1905 | Kremer . |
| 1,811,181 | 6/1931 | Maltby . |
| 2,358,587 | 9/1944 | Ornstein . |
| 2,696,800 | 12/1954 | Rork . |
| 2,877,051 | 3/1959 | Cushman et al. . |
| 3,723,304 | 3/1973 | Stopck . |
| 3,837,492 | 9/1974 | DiBello ............... 210/150 |
| 3,847,811 * | 11/1974 | Stengelin . |
| 3,849,304 | 11/1974 | Torpey et al. . |
| 3,869,380 | 3/1975 | Torpey . |
| 3,886,074 * | 5/1975 | Prosser . |
| 3,957,634 | 5/1976 | Orensten et al. . |
| 3,965,011 * | 6/1976 | Sheaffer . |

(List continued on next page.)

FOREIGN PATENT DOCUMENTS

| | | |
|---|---|---|
| 478669 | 12/1915 | (FR) . |
| 2 250 021A | 5/1992 | (GB) . |
| 57-1489 | of 1982 | (JP) . |
| 62-97694 | of 1987 | (JP) . |
| 8504306 | 10/1985 | (WO) . |
| 8605770 | 10/1986 | (WO) . |
| 9119680 | 12/1991 | (WO) . |
| 9221620 | 12/1992 | (WO) . |
| 9508512 | 3/1995 | (WO) . |

OTHER PUBLICATIONS

"'Beta–test' model of new Cell–Pore BioRocker now being offered to aquatics professionals," downloaded from http://www.cercona.com/biorocker.html on Sep. 14, 2000 (sic).*

Results of search of US Trademark Electronic Search System (TESS) conducted on Sep. 16, 2000 for US trademark registration applications filed on Aug. 1, 2000.*

Results of search of US Trademark Electronic Search System (TESS) ("goods and services" data subset) conducted on Sep. 16, 2000 for US trademark registration applications: "filtration" and "ceramic".*

International Search Report relating to corresponding International Application No. PCT/US00/14117 mailed Aug. 29, 2000.

Primary Examiner—Chester T. Barry
(74) Attorney, Agent, or Firm—Thompson Hine & Flory LLP

(57) ABSTRACT

A biological filter for filtering a stream of falling liquid, the filter comprising a body movable between a first and a second position, and a first filter portion coupled to the body such that the first filter portion is positioned under the stream when the body is in the first position. The filter further comprises a second filter portion coupled to the body such that the second filter portion is positioned under the stream when the body is in the second position, wherein the body reciprocates between the first and the second positions when located below the stream of liquid.

41 Claims, 9 Drawing Sheets

U.S. PATENT DOCUMENTS

| | | |
|---|---|---|
| 4,055,301 * | 10/1977 | Hruby . |
| 4,070,138 * | 1/1978 | Stanwood . |
| 4,112,037 * | 9/1978 | Parker . |
| 4,157,303 | 6/1979 | Yoshikawa et al. . |
| 4,160,736 | 7/1979 | Prosser . |
| 4,177,147 | 12/1979 | Roberts . |
| 4,189,386 | 2/1980 | Aman . |
| 4,267,051 | 5/1981 | Uhlmann . |
| 4,268,385 | 5/1981 | Yoshikawa . |
| 4,282,095 | 8/1981 | Tsuhako . |
| 4,284,503 | 8/1981 | Stähler . |
| 4,285,813 * | 8/1981 | Stewart . |
| 4,305,822 * | 12/1981 | Eimer . |
| 4,318,810 | 3/1982 | Stähler . |
| 4,333,893 * | 6/1982 | Clyde . |
| 4,364,826 | 12/1982 | Kato . |
| 4,385,660 * | 5/1983 | Koller . |
| 4,387,195 * | 6/1983 | Tully . |
| 4,448,696 * | 5/1984 | White, Jr. . |
| 4,481,905 * | 11/1984 | Fonseca . |
| 4,539,115 * | 9/1985 | Patzig . |
| 4,563,282 * | 1/1986 | Wittmann . |
| 4,622,148 | 11/1986 | Willinger . |
| 4,668,387 | 5/1987 | Davie et al. . |
| 4,680,113 * | 7/1987 | Eimer . |
| 4,737,278 | 4/1988 | Miller . |
| 4,901,630 * | 2/1990 | Hall . |
| 4,923,487 * | 5/1990 | Bogart . |
| 4,995,980 | 2/1991 | Jaubert . |
| 5,078,867 | 1/1992 | Danner . |
| 5,122,286 * | 6/1992 | Kreyenborg . |
| 5,160,622 | 11/1992 | Gunderson et al. . |
| 5,171,438 * | 12/1992 | Korcz . |
| 5,228,986 | 7/1993 | Ellis et al. . |
| 5,393,424 * | 2/1995 | Liang . |
| 5,397,474 | 3/1995 | Henry . |
| 5,419,831 * | 5/1995 | Fuerst . |
| 5,423,978 | 6/1995 | Snyder et al. . |
| 5,460,722 | 10/1995 | Chen . |
| 5,603,831 | 2/1997 | Hickok . |
| 5,624,571 | 4/1997 | Bennett . |
| 5,626,761 * | 5/1997 | Howery . |
| 5,647,983 * | 7/1997 | Limcaco . |
| 5,679,253 * | 10/1997 | Fuerst . |
| 5,685,978 | 11/1997 | Petrick et al. . |
| 5,693,220 * | 12/1997 | Sceusa . |
| 5,779,885 * | 7/1998 | Hickok . |
| 5,853,591 * | 12/1998 | Snyder . |
| 6,059,963 * | 5/2000 | Horakova . |
| 6,117,320 * | 9/2000 | Rutz . |

\* cited by examiner

RECIPROCATING BIOLOGICAL FILTER

The present invention is directed to a biological filter for removing toxins from a liquid, and more particularly, to a biological filter that reciprocates under a falling stream of liquid to remove toxins from the liquid.

BACKGROUND OF THE INVENTION

Biological filters are used in a wide range of applications to filter toxins and other waste material from liquids. The biological filters operate by cultivating bacteria on the filter surfaces that "filter" the liquid. Thus, when the liquid to be filtered is brought into contact with the filter surfaces, the bacteria converts the toxins or waste material in the liquid into less harmful compounds. For example, when used in aquariums, the filter may foster the growth of aerobic nitrosomonas bacteria and aerobic nitrobacter bacteria. When the aquarium water is flowed over the filter, the aerobic nitrosomonas bacteria converts waste products, such as ammonia compounds, into nitrites. The aerobic nitrobacter bacteria then converts the nitrites to nitrates. The end result of the conversion (nitrates) are only mildly toxic to fish in high concentrations, and can be controlled by regular water changes, or by other means. The above-described biofilter system may also be used, in a similar fashion, in waste treatment, pollution control, fermentation processes, aquaculture and other settings.

Because oxygen is consumed in the conversion processes carried out by the bacteria, a regular supply of oxygen must be provided to the filter surfaces. The oxygen may be supplied either by dissolved air in the water, or by the adsorption of oxygen from the air directly by the bacteria layer. "Wet/dry" biofilters regularly expose the filters surfaces to air to supply the necessary oxygen to the bacteria. There are basically three types of wet/dry biofilters employed in the state of the art. The first is a "soak/drain filter" wherein a container is partially filled with a high surface area media upon which the bacteria is grown. The container is filled with liquid to bring liquid into contact with the bacteria. The liquid is then drained from the container to allow the bacteria to adsorb the necessary oxygen. Replacement liquid is then introduced into the container, and the fill/drain process is regularly repeated to filter the liquid. The soak/drain biological filter requires either mechanical means to empty the container, or the use of a siphon tube or valve to drain the water. These mechanical means increase construction and maintenance costs of the soak/drain filter system.

A second type of wet/dry biological filter is a "trickle filter" wherein a column, tank or large enclosure is partially filled with a high surface area media upon which the bacteria is cultured. The water to be filtered is trickled through the column, tank or enclosure such that it contacts the bacteria growing on the media. Trickle filters are usually bulky, and require large amounts of space.

A third type of biological filter is a "rotating biological contacter." The rotating biological contacter is typically a finned, generally cylindrical filter body that is rotated to alternately expose portions of the filter to the liquid and to air. The bottom of the rotating filter may be submerged in the liquid to be filtered, or the liquid may be sprayed directly onto the cylindrical body. The cylindrical body may be rotated by the force of liquid, or a separate motor may be used to rotate the cylindrical body. The rotating biological contacter typically has a lower surface area compared to other biological filters which may reduce its effectiveness. Furthermore, the cylindrical body may become unbalanced due to an uneven accumulation of algae, biomass, or other foreign matter, which can inhibit the rotation of the cylindrical body. Furthermore, the rotational speed of the body must also be regulated to avoid throwing water off of the surface of the body by centrifugal forces.

The efficiency of the filtration process is maximized when the greatest population of bacteria contacts a given volume of water. To this end, high surface area porous substrates having large open pores help improve the efficiency of biological filters. Besides providing a high surface area, large pores also reduce the chances of pores being plugged with bacteria or other foreign substances. Ideally, the morphology of the substrate ensures that water can easily move into contact with the bacteria on the surface of the filter, reside in contact with the bacteria for sufficient time, and then be drained to allow air to replace the water to be absorbed by the bacteria.

Accordingly, there is a need for a biological filter which fosters the growth of bacteria, can filter large volumes of liquid relatively quickly, is of simple construction, is compact, and avoids adverse effects due to the buildup of algae or other biomass.

SUMMARY OF THE INVENTION

The present invention is a biological filter that is mechanically simple, provides a high surface area for effective filtration, is relatively compact, and avoids or accommodates the problems associated with excessive algae or bio-mass buildup. The present invention employs a body that rocks between two positions. The body has a pair of filter elements coupled thereto, each of which is alternately saturated and drained of liquid. In this manner, the growth of bacteria is fostered, while large amounts of liquid are brought into contact with the bacteria.

The body is positioned below a stream of falling liquid to filter the liquid due to the growth of bacteria on the filter portions. The filter is constructed such that as the body reciprocates, one of the filter portions is positioned below the stream of liquid. As one filter portion is positioned below a stream of liquid, it absorbs at least a portion of the liquid, while the other filter portion simultaneously drains most of the liquid that is in that filter portion. Once sufficient draining and absorption has occurred, the body "tips" or "rocks" to the other side, and the other filter portion is then positioned under the liquid stream. The absorption and draining continues as the filter reciprocates back and forth underneath the stream. The present invention is mechanically simple, as there is no container to be tipped, nor any valves or siphon tubes to be operated. The invention also provides a relatively high surface area and is compact. Finally, the present invention can continue to reciprocate even when there is a buildup of algae or other biomass. The invention may be used in industrial and non-industrial waste treatment, pollution control, fermentation processes, aquaculture, aquariums, and other settings.

In particular, the present invention is a biological filter for filtering a stream of falling liquid, the filter comprising a body movable between a first and a second position, and a first filter portion coupled to the body such that the first filter portion is positioned under the stream when the body is in the first position. The filter further comprises a second filter portion coupled to the body such that the second filter portion is positioned under the stream when the body is in the second position, wherein the body reciprocates between the first and the second positions when located below the stream of liquid.

DETAILED DESCRIPTION

Figure 1:
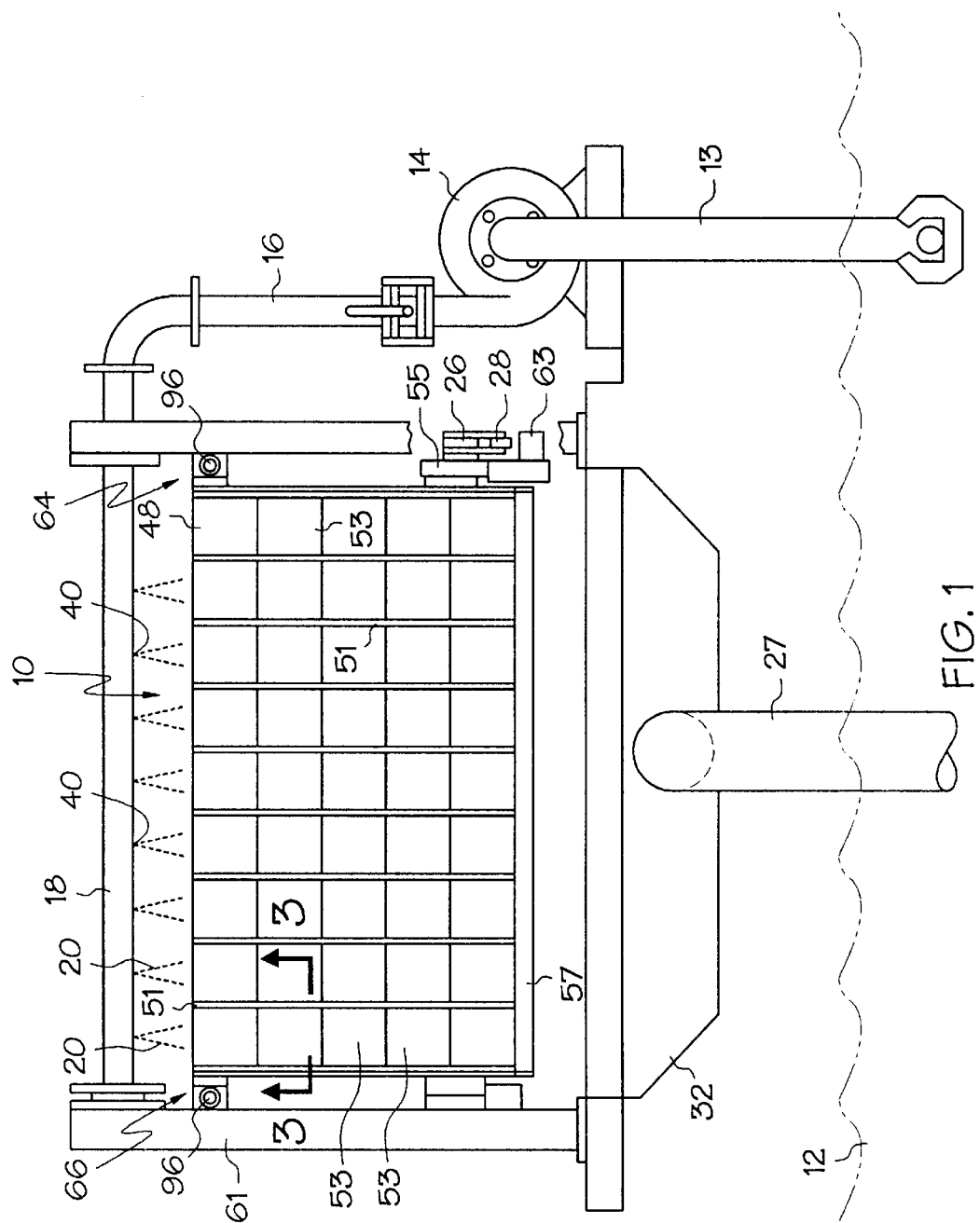
FIG. 1 is a front view of a filter system employing the biological filter of the present invention.
Figure 2:
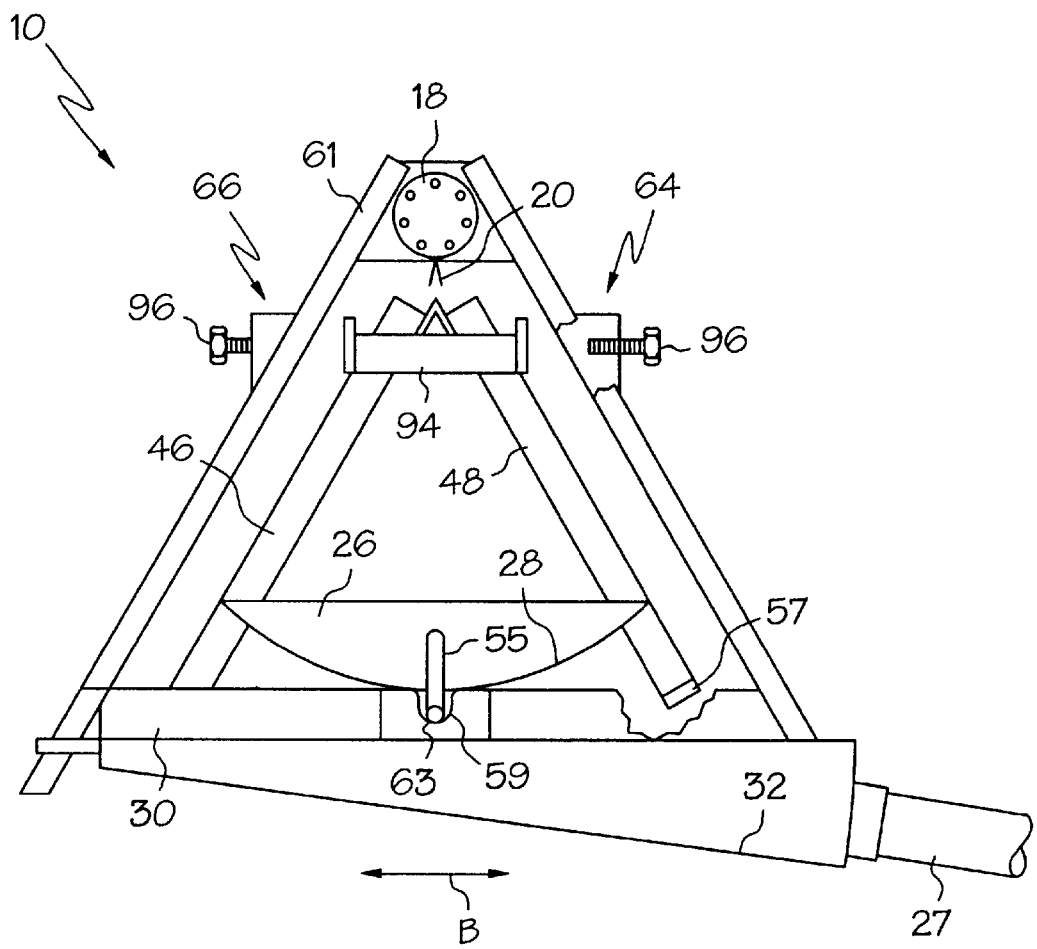
FIG. 2 is a side view of the filter system of FIG. 1.

As shown in FIG. 1, the filter 10 of the present invention is preferably used to filter liquid from a liquid source 12, that may be contained in a supply tank. The liquid 12 may be nearly any liquid that may be filtered by bacteria or other microorganisms. Hereinbelow, however, the liquid will be described as water. A pump 14 draws water from the source 12 through a pipe 13, and passes it through a delivery pipe 16. The delivery pipe 16 delivers the water to the spray bar 18 where it exits the spray bar through a plurality of holes 40 as a plurality of liquid streams or liquid sprays 20. The streams 20 flows across the reciprocating filter 10, and are biofiltered by the first 46 and second 48 filter portions (FIG. 2). The filter 10 includes a body 26 having a base 28 that rests on a support surface 30, and the base 28 reciprocates on the surface 30 as will be discussed in greater detail below. The water drained from the filter 10 is captured by a drain tray 32 and returned to the liquid source 12 by means of a return pipe 27. A cover (not shown) may be located over the filter 10 to buffer wind and block sunlight to limit algae buildup.

Figure 4:
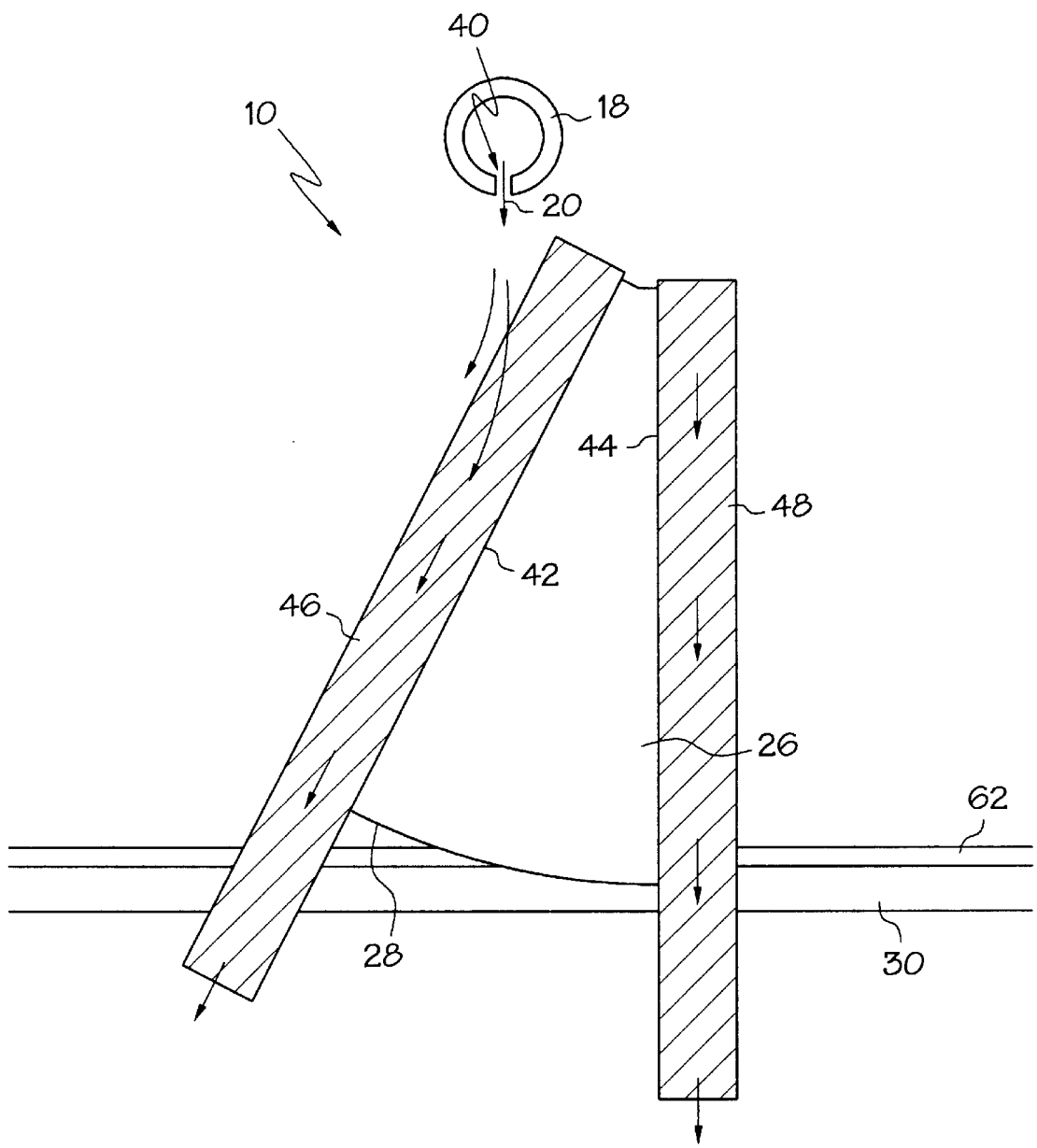
FIG. 4 is a side cross sectional view of one embodiment of the biological filter of the present invention, shown in a first position on a support surface, and shown with a spray bar.

As shown in FIG. 4, the present invention includes a biological filter 10 for filtering a stream of liquid. The stream of liquid 20 is delivered to the filter by a spray bar 18 which has one or more holes 40 through which the liquid may exit the spray bar. In the embodiment of FIG. 4, the filter 10 includes a body 26 that is generally triangular in side view. The body 26 has a first side 42, a second side 44, and a base 28. A first filter portion 46 is coupled to the first side 42 and a second filter portion 48 is coupled to the second side 44 of the body 26. The first 46 and second 48 filter portions form an angle therebetween, preferably between about 20 and about 60 degrees. The filter portions 46, 48 are preferably generally rectangular in front view, and each filter portion 46, 48 has a planar outer surface. The filter portions are preferably constructed of a large-pore material and have a surface area of about one square meter/gram.

Figure 5:
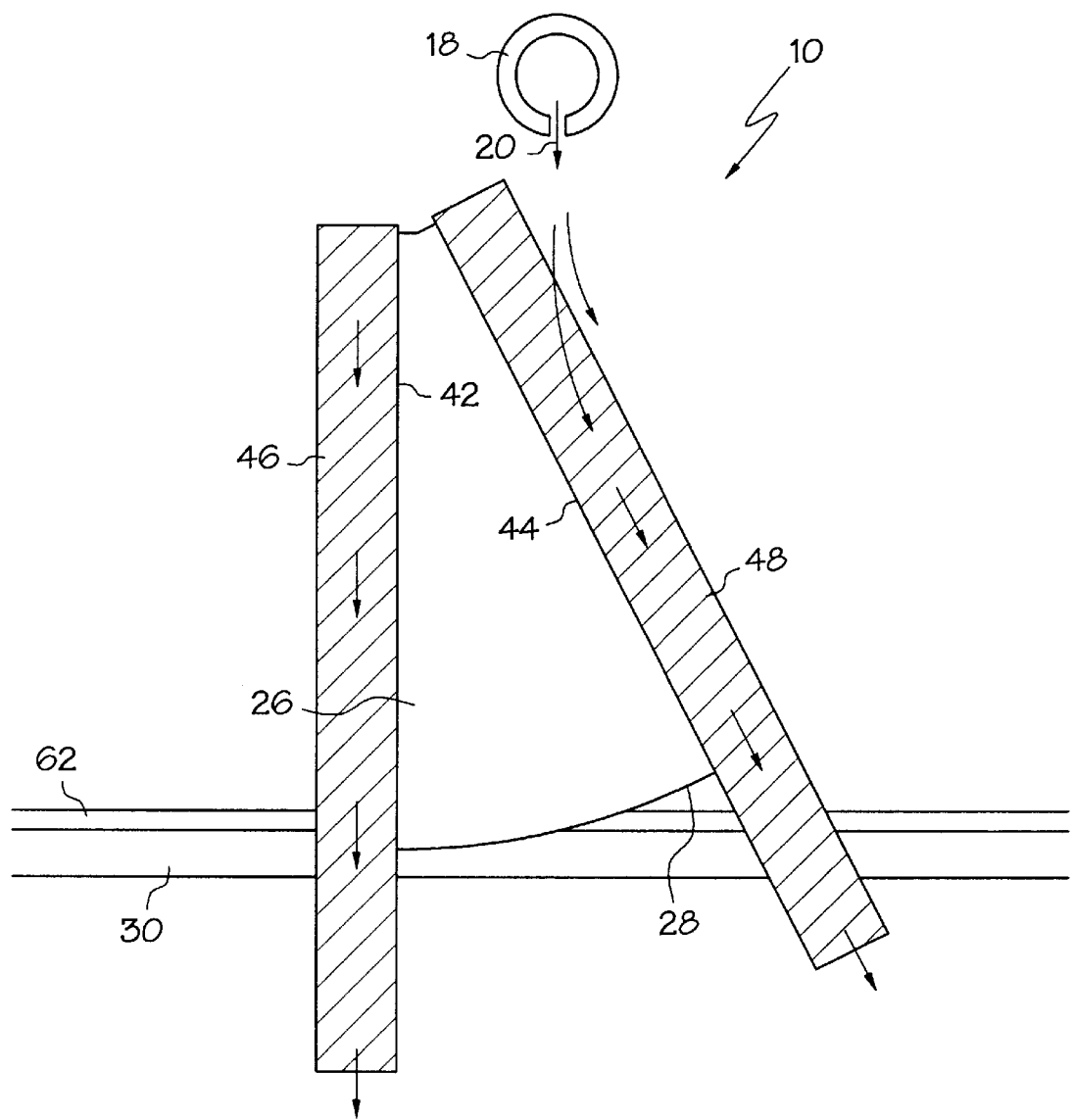
FIG. 5 is a side cross sectional view of the biological filter, support surface, and spray bar of FIG. 4, the filter shown in a second position.
Figure 6:
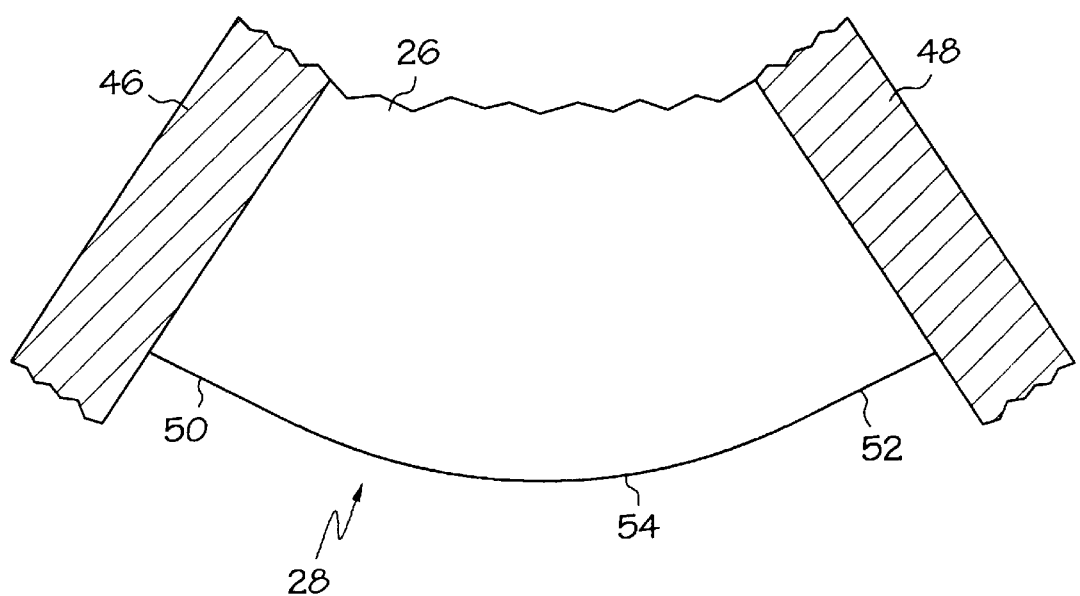
FIG. 6 is a detail view of the base of the filter of FIG. 4.

The body 26 is movable between a first stable position (FIG. 4) and a second stable position (FIG. 5). In the embodiment of FIGS. 4–5, the body 26 "rocks" on the base 28 of the body 26 between the stable positions. As shown in greater detail in FIG. 6, in one embodiment, the base 28 has a first flat 50 and a second flat 52. A generally curved surface 54 extends between the first 50 and second 52 flat. The body 26 of FIG. 6 is designed such that it is "bi-stable"; that is, it resides in either a first stable position corresponding to the first flat 50, or a second stable position corresponding to the second flat 52. The term "stable position" means a position that the body tends to rest at in the absence of outside forces. However, during operation the body may not necessarily reside at a stable position for any appreciable amount of time. In the embodiment of FIG. 6, the body 26 is unstable when resting on the central curved portion 54. The body 26 may rock back and forth between the stable positions as discussed in greater detail below. The body's vertical center line is preferably located directly below the flowing stream of water 20 such that the body 26 is centered below the stream of liquid. The rocking motion provided by the body 26 shown in FIGS. 4–5 provides a gradual deceleration of the body 26 as it approaches a stable position. This helps to lessen the stresses on the filter system, particularly on the stops that may be provided to limit the rocking motion of the filter 10.

Figure 7:
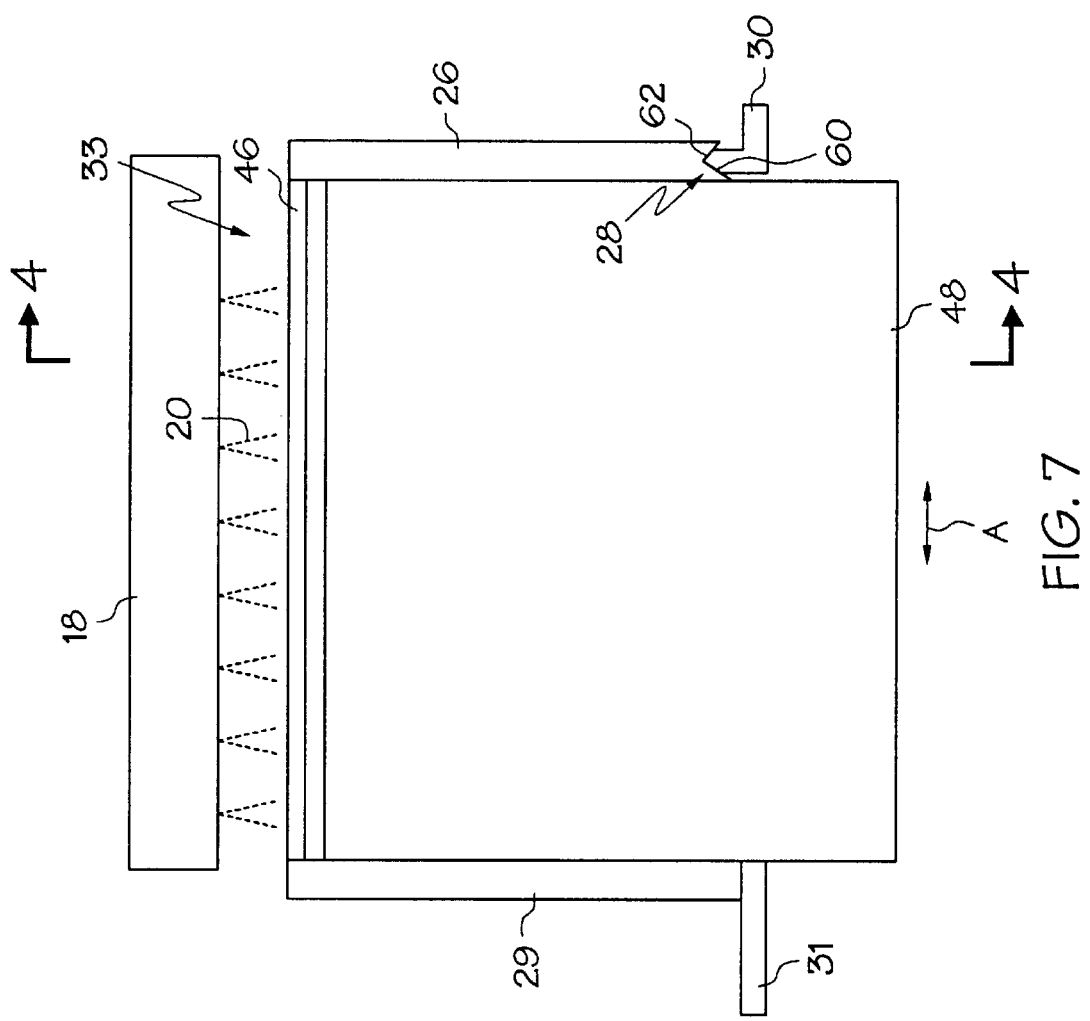
FIG. 7 is a front view of the filter, support surface and spray bar of FIG. 4.

As shown in FIGS. 4–5, the filter 10 is supported on a surface 30 such that the filter portions 46, 48 may rock between the stable positions. As best illustrated in FIG. 7, the base 28 may include a generally "V-shaped" notch 60 which receives a tapered flange 62 on the surface 30. The tapered flange 62 and notch 60 maintain the alignment of the filter upon the surface 30 to ensure the filter 10 does not move in the direction of the longitudinal axis of the spray bar 18 (the "longitudinal direction" indicated by arrow A). Of course, various other arrangements may be used to keep the filter 10 centered below the spray bar 18. The filter 10 may include another body 29 at the other end of the filter portions 46, 48 that rests on another surface 31 for support. In the illustrated embodiment, the body 29 and surface 31 do not include interengaging geometries, although such geometries may be provided. The body 29 and body 26 make up a main body 33 that receives the filter portions 46, 48 therein.

The operation of the filter 10 is as follows. The filter body 26 may begin in the first stable position, as shown in FIG. 4. In this orientation, the water 20 falling from the spray bar 18 impinges upon the first filter portion 46, and is generally absorbed by the first filter portion 46 or runs down the surface of the first filter portion 46. The water trickles through the filter 46 and exits at the bottom of the first filter portion 46. As the first filter portion 46 absorbs water, it increases in weight. Simultaneously, any water that is contained in the second filter portion 48 tends to drain from the second filter portion 48, which decreases the weight of the second filter portion 48. Once the center of gravity of the filter 10 has shifted sufficiently towards the soaking side 46, the filter 10 rocks to the second stable position, as shown in FIG. 5. In this position, the water stream 20 from the spray bar 18 impinges upon the second filter portion 48. The second filter portion 48 absorbs water and increases in weight, while the first filter portion 46 loses water and decreases in weight. The filter 10 is preferably constructed such that each filter portion, when draining, is generally vertical to provide an optimal draining position. Once the center of gravity of the filter 10 sufficiently moves towards the second filter portion 48, the filter 10 again rocks back to the first stable position shown in FIG. 4. This reciprocation continues for as long as water is deposited on the filter 10 by the spray bar 18.

The body is preferably constructed such that it resides in one of the stable positions so that the filtering process can properly commence. The body should be in one of the stable positions when the filtering process begins so that it absorbs the liquid in an uneven manner to ensure reciprocation. If the body is centered under the falling stream when the filtering process beings, the flow across the filter elements may be approximately equal, and the body may thereby not reciprocate.

In an alternate embodiment, the filter 10 is continually rocking, and therefore does not come to rest at the stable positions. In this embodiment, the center of gravity of the filter 10 shifts quickly enough that the filter 10 begins to change direction before it has had time to come to rest in a stable position. Thus, in this embodiment, although the body 26 may in theory have stable positions, the filter 10 does not come to rest at the stable positions. Alternately, the filter 10 may not have any stable positions.

The morphology of the open pore material from which the filter portions 46, 48 are constructed is important to the performance of the filter. The ratio of water flow rate provided by the stream 20 to the filter's pore volume is the primary determinate of the residence time at each stable position. Gravity draws the water out of the draining filter portion until the remaining water is held in place by capillary forces. The filter portions are preferably constructed of a large-pore material and have a surface area of about one square meter/gram. The filter portions are preferably made of CELL-PORE™ rigid ceramic foam manufactured by Cercona of America of Dayton, Ohio. The filter portions 46, 48 preferably have intercellular pores having a size of about 50–400 microns, and the cell walls have micro pores having a size of about 5–10 microns.

A pair of stops may be employed to limit the rocking of the filter 10, and the stops may be adjusted to fine tune the residence time of the filter 10 at each position. One form of the stops are shown as stops 64, 66 in FIG. 2. In the illustrated embodiment, the stops 64, 66 include threaded fasteners 96 that engage a stop plate 94 that is mounted on the filter 10. The fasteners 96 may be rotated to adjust the point at which the stop plate 94 contacts the fasteners to adjust the orientation of the filter 10 in the stable positions. For optimum efficiency, when the draining of a filter portion 46, 48 slows to a noncontinuous flow, the filter 10 should be shifted to the other stable position. The time it takes the water to flow from a filter portion 46, 48 is determined primarily by the pore size, which determines the capillary forces that holds the remaining water in place in the filter portion. The residence time can be adjusted to the optimum times by adjusting the stops 64, 66 which changes the weight force required to overcome the stability of the filter 10 and cause the filter to shift in position. The stops 64, 66 may also be adjusted to account for an out of level condition of the surface 30, or to account for an out of balance condition of the body 26 (i.e. uneven algae growth on the body). Furthermore, the stops 64, 66 may be adjusted such that the residence time at each stable position is unequal. In this manner, a higher percentage of the water flow is diverted to one side, and this feature may be useful in certain settings.

Figure 3:
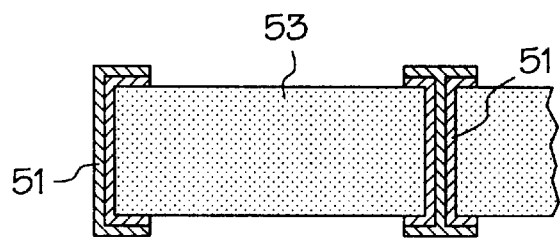
FIG. 3 is a partial cross sectional view of the filter of FIG. 1 taken along lines 3—3 of FIG. 1.

In the embodiment shown in FIGS. 1–3, the filter portions 46, 48 are made of a plurality of blocks 53 of filter material. The blocks 53 are stacked on top of one another, and captured between the adjacent I-beams 51. A fiberglass grating 57 or the like may be located along the bottom of the filter portions 46, 48, to keep the blocks 53 in place. The stops 64, 66 and spray bar 18 are mounted on an "A" frame 61. The base 28 may include a rocker pin or rod 55 having a rounded head 63 that is received in a notch 59 in the support surface 30. The pin 55 and notch 59 cooperate to ensure the filter 10 remains centered below the spray bar 18. Alternately, a knife edge that is received in the notch 59 may be used in place of the rocker pin 55. Further alternately, the support surface may be bowed such that the lowest point of the support surface is at the lateral center of the support surface 30. In this manner the filter 10 may be maintained at the center of the support surface. The rocker pin 55, knife edge, and other acceptable arrangements may all be interchangeably used on the body 26 of the filter 10 to maintain the body centered below the longitudinal axis of the spray bar 18 (that is; to ensure the filter 10 does not move in a lateral direction indicated by arrow B).

Figure 8:
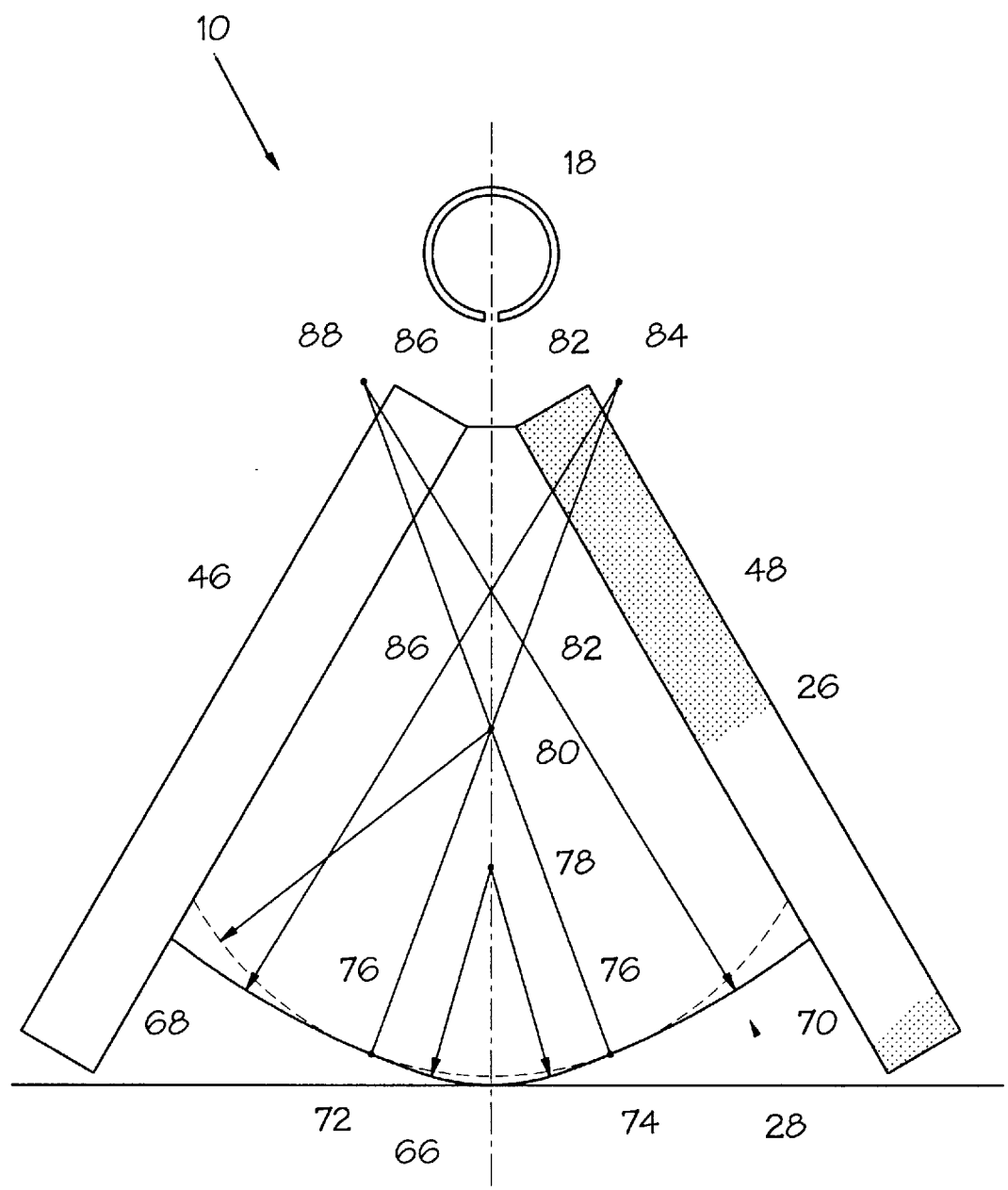
FIG. 8 is a side cross sectional view of an alternate embodiment of the biological filter of the present invention.
Figure 10:
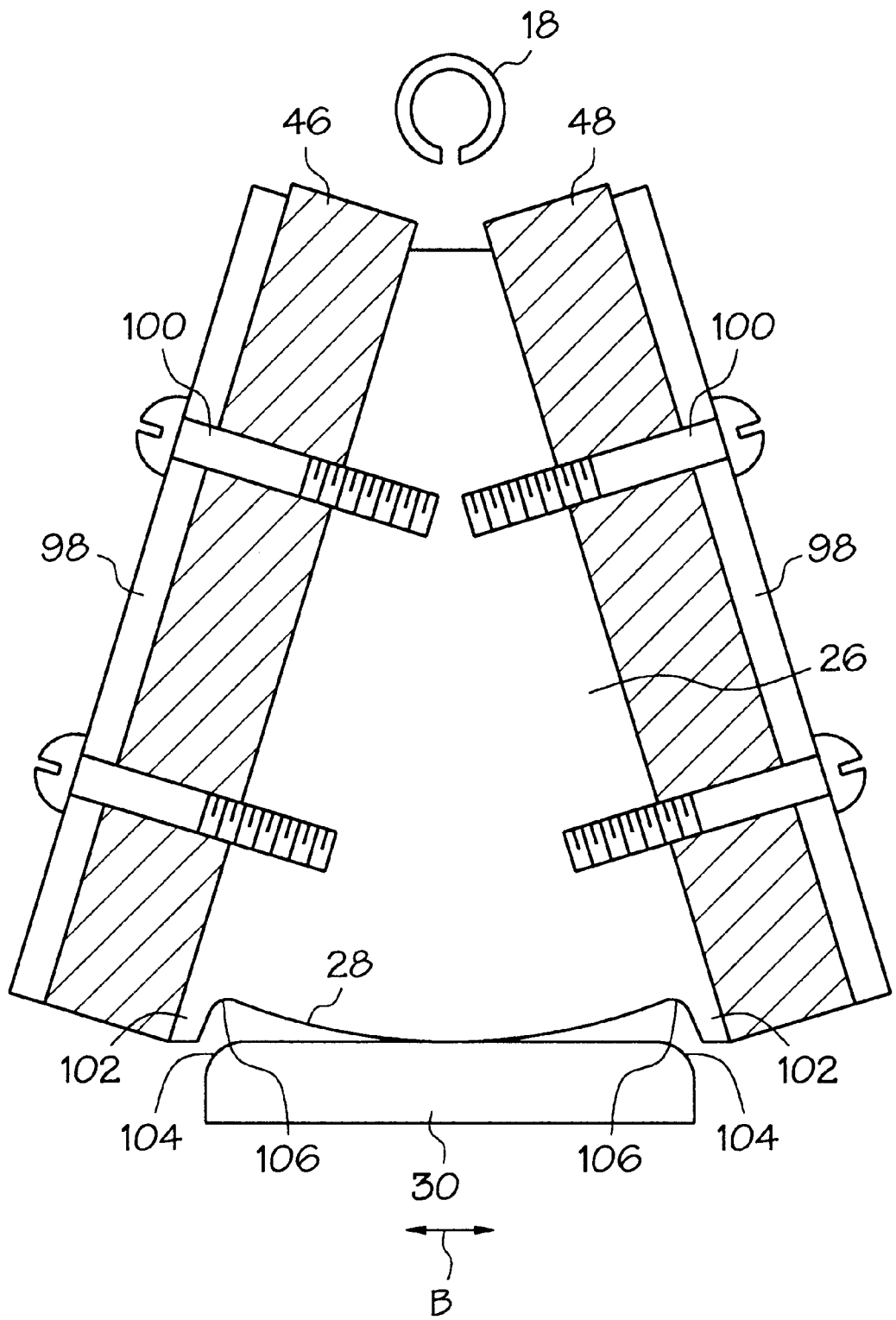
FIG. 10 is a side cross sectional view of another alternate embodiment of the present invention.

An alternate embodiment of the invention is shown in FIG. 8. In this embodiment, the base 28 of the body 26 has a different shape than the embodiment shown in FIGS. 4–5. In the FIG. 8 embodiment, the base 28 includes a central curved portion 66 that is flanked by a first outer curved portion 68 and a second outer curved portion 70. A pair of stable points 72, 74 are located at the transition between the central curved portion 66 and the outer curved portions 68, 70. The central curved portion 66 is defined by a radius 76 that extends from a point 78 below the center of gravity 80 of the filter 10. The first outer curved portion 68 is defined by a radius 82 that extends from a point 84 above the center of gravity 80, and the second outer curved portion 70 is defined by a radius 86 that extends from a point 88 above the center of gravity 80. In this arrangement, the central curved portion 66 is an unstable zone, and the filter tends to come to rest at the stable points 72, 74. The center of gravity 80 of the filter vertically shifts as the filter reciprocatingly rocks between the stable points 72, 74. Because the center of gravity is at its lowest position when the filter is resting on one of the stable points 72, 74, the filter will reside such that it rests on one of the stable points 72, 74 in the absence of outside forces. It should be understood that the filter 10 shown in FIG. 8, as well as the filter 10 shown in FIGS. 2 and 10, are shown in an unstable condition. The filter 10 would not typically reside in such a position, except during a transition. The filter 10 is shown in the unstable position in FIGS. 2, 8 and 10 for illustrative purposes only.

In operation, as the filter 10 in FIG. 8 reciprocates back and forth, the filter will tend to "overshoot" the stable points 72, 74 as it moves to the first stable position or the second stable position. The filter will then correct itself by rocking in the opposite direction until it rests on the stable point. The base 28 of the filter of FIG. 8 provides a smooth rocking motion as the filter 10 reciprocates back and forth. The filter 10 of FIG. 8 is shown as rocking on top of a generally flat support surface 30, but interengaging arrangements of the base 28 and surface 30 may be used.

Figure 9:
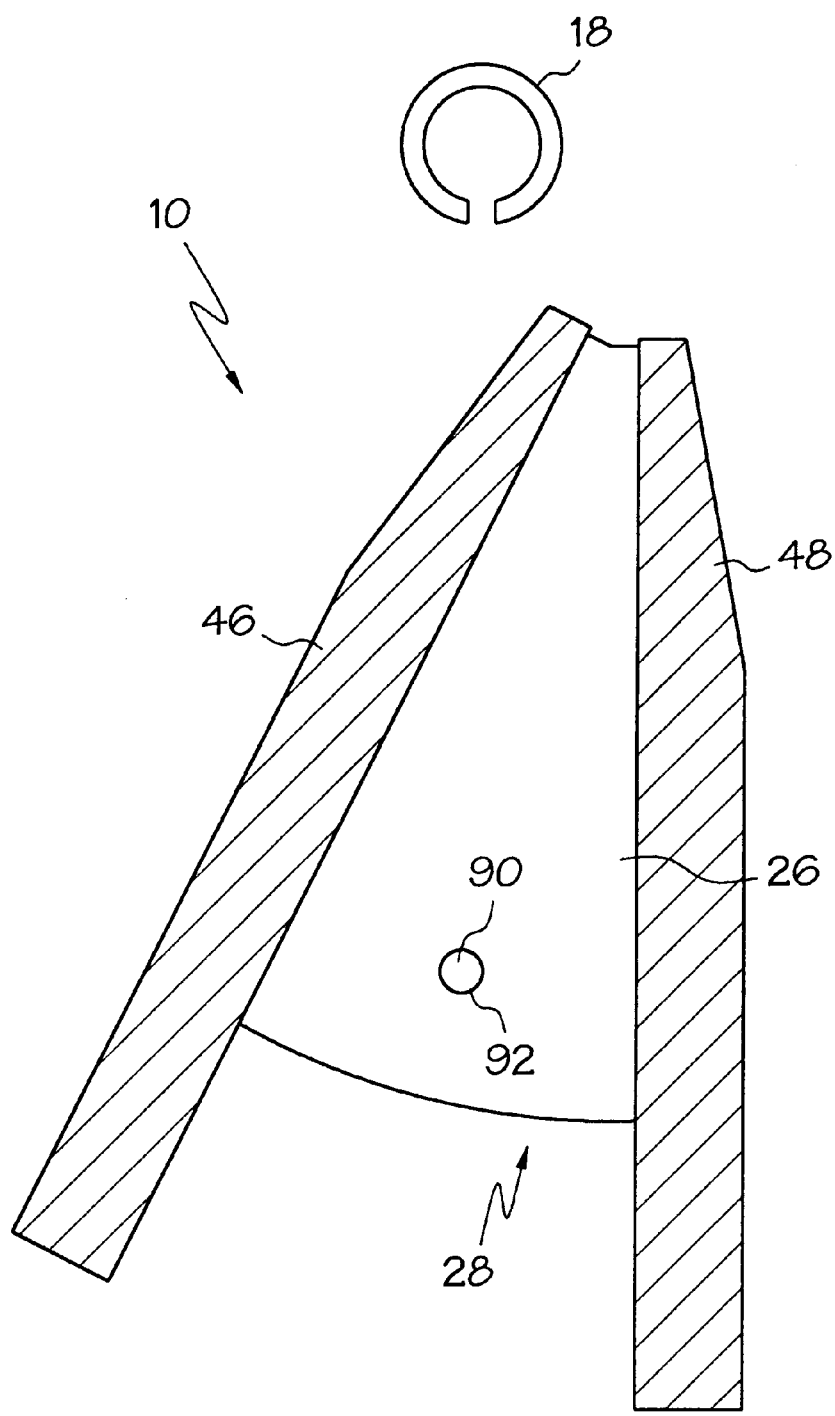
FIG. 9 is a side cross sectional view of another alternate embodiment of the biological filter of the present invention.

Yet another embodiment of the invention is shown in FIG. 9. In this embodiment, the filter 10 reciprocatingly pivots about a pivot point 90. The pivot point 90 may be nearly any type of pivot or support, and in the illustrated embodiment the pivot point 90 is a pin 92 passed through the body 26. The pin 92 may be supported by an A-frame similar to the A-frame 61 of FIG. 1, or by other acceptable means. The pin 92 is preferably located below the center of gravity of the filter 10. This embodiment of the filter 10 is relatively compact and easy to manufacture.

Another embodiment of the filter of the present invention is shown in FIG. 10. In this embodiment, an outer frame 98 is secured to the filter portions 46, 48 by a set of fasteners 100 that are received in the body 26. The body 26 includes a pair of feet 102 that engage the support surface 30 to keep the body 26 centered below the spray bar 18 in the lateral direction B. The feet 102 and corner surfaces 104 of the support surface 30 are rounded such that if the filter 10 is out of alignment, the corner surfaces 104 are guided into the elbows 106 in the body 26 to thereby center the body 10 below the spray bar 18. Another body 26 (not shown) may be coupled to the other ends of the filter bodies 46, 48. If desired, a pair of tabs or buttons that overhang the surface 30 may be attached to the bodies 26 to keep the filter 10 from moving in the longitudinal direction. Various other arrangement may also be used to keep the filter from moving in the longitudinal direction without departing from the scope of the invention.

While the forms of the apparatus described herein constitute a preferred embodiment of the invention, the present invention is not limited to the precise forms described herein, and changes may be made therein without departing from the scope of the invention.

What is claimed is:

1. A biological filter for filtering a stream of falling liquid, the filter comprising:
    a body movable between a first and a second position;
    a first filter portion coupled to said body such that said first filter portion is positioned under said stream when said body is in said first position; and
    a second filter portion coupled to said body such that said second filter portion is positioned under said stream when said body is in said second position;
    and wherein said body rocks between said first and said second positions when located below said stream of liquid.

2. The biological filter of claim 1 wherein said first position and said second position are stable positions.

3. The biological filter of claim 1 wherein said first filter portion absorbs at least a portion of said falling liquid when said body is in said first position, and wherein said second filter portion absorbs at least a portion of said falling liquid when said body is in said second position.

4. The biological filter of claim 1 wherein at least a portion of any liquid contained in said first filter portion drains from said first filter portion when said body is in said second position, and wherein at least a portion of any liquid contained in said second filter portion drains from said second filter portion when said body is in said first position.

5. The biological filter of claim 1 wherein said body receives said first and second filter portions therein.

6. The biological filter of claim 1 wherein said first and second filter portions each include a generally planar outer surface.

7. The biological filter of claim 1 wherein said first and second filter portions are porous.

8. The biological filter of claim 7 wherein said first and second filter portions have a pore size of between about 50 and about 400 microns.

9. The biological filter of claim 7 wherein said first and second filter portions are made from rigid ceramic foam.

10. The biological filter of claim 7 wherein said first and second filter portions are shaped to foster the growth of bacteria thereon to filter said liquid.

11. The biological filter of claim 1 wherein said first and second filter portions form an angle therebetween.

12. The biological filter of claim 11 wherein said angle is between about 20 and about 60 degrees.

13. The biological filter of claim 1 wherein said body includes a base upon which said body rocks, and wherein said first and second positions are stable positions.

14. The biological filter of claim 13 wherein said base includes a pair of flats on which said body rests when said body is in said first or said second stable positions.

15. The biological filter of claim 14 wherein said base includes a generally curved surface located between said pair of flats, said curved surface defining an unstable position.

16. The biological filter of claim 1 wherein said body is shaped to be supported on a support surface such that said body can rock on said support surface when said body moves between said first and said second positions.

17. The biological filter of claim 16 wherein said body is shaped to interengage with said support surface to limit the motion of said body in a lateral direction.

18. The biological filter of claim 17 wherein said body includes a protrusion that is shaped to be received in a groove in said support surface to limit the motion of said body in said lateral direction.

19. The biological filter of claim 16 wherein said body is shaped to interengage with said support surface to limit the motion of said body in said longitudinal direction.

20. The biological filter of claim 19 wherein said body includes a flange that is shaped to abut against said support surface to limit the motion of said body in said longitudinal direction.

21. The biological filter of claim 1 further comprising a pair of stops to limit the reciprocal motion of said filter.

22. The biological filter of claim 21 wherein said stops are adjustable to control the distance said body moves as said body reciprocates.

23. The biological filter of claim 13 wherein said base includes a generally curved central portion having a pair of stable points thereon which correspond to said first stable position and said second stable position, respectively.

24. The biological filter of claim 23 wherein said base includes a first outer curved portion and a second outer curved portion adjacent said central curved portion, and wherein said first and second stable points are located at the intersection of said central curved portion and said outer curved portions.

25. The biological filter of claim 24 wherein said outer curved portions each have a greater radius of curvature than the radius of curvature of said central curved portion.

26. The biological filter of claim 1 wherein said body pivots about a pivot point when said body reciprocates between said first position and said second position.

27. The biological filter of claim 26 wherein said pivot point is defined by a pin passed through at least a portion of said filter.

28. The biological filter of claim 26 wherein said pin is mounted below the center of gravity of said filter.

29. The biological filter of claim 1 wherein said body includes a pair of spaced body elements shaped to receive said filter portions therebetween.

30. The biological filter of claim 2 wherein said body is unstable when said body is not located in one of said stable positions.

31. The biological filter of claim 1 wherein said reciprocal movement alternatingly positions said first and said second filter portions below said stream of liquid.

32. A biological filter for filtering a stream of falling liquid, the filter comprising:
    a first generally planar filter portion; and
    a second generally planar filter portion coupled to said first filter portion such that said first and second filter portions are alternatingly positioned below said stream to thereby filter said liquid;

wherein said filter reciprocates under said stream to cause said alternating positioning.

33. The biological filter of claim 32 wherein said first generally planar filter portion forms an angle with said second generally planar filter portion.

34. The biological filter of claim 32 wherein said first and second filter portions alternately absorb at least a portion of said falling liquid to cause said alternating positioning.

35. A biological filter for filtering a stream of falling liquid, the filter comprising:

a first filter portion; and a second filter portion coupled to said first filter portion, said filter being movable between a first position wherein said first filter portion is positioned under said stream and a second position wherein said second filter portion is positioned under said stream, and wherein said first and second filter portions alternately absorb and drain at least a portion of said stream when located below said stream to cause to body to reciprocate between said first and said second positions.

36. The filter of claim 35 wherein said body rocks between said first and second positions.

37. The filter of claim 35 wherein said first and second positions are stable positions.

38. The filter of claim 35 wherein said first and second filter portions are each generally planar and coupled to each other such that said first and second filter portions form an angle.

39. The filter of claim 35 wherein said second filter portion is not located below said stream when said filter is in said first position, and wherein said first filter portion is not located below said stream when said filter is in said second position.

40. A biological filter for filtering a stream of falling liquid, the filter comprising:

a first generally planar filter portion; and a second generally planar filter portion coupled to said first filter portion and forming an angle with said first filter portion, wherein said filter is movable between a first position wherein said first filter portion is positioned under said stream and said second filter portion is not positioned under said stream and a second position wherein said second filter portion is positioned under said stream and said first filter portion is not positioned under said stream, and wherein said filter reciprocates between said first and said second positions when located below said stream of liquid.

41. A method for filtering a stream of falling liquid, the method comprising the steps of:

selecting a filter having a first filter portion and a second filter portion, said filter being movable between a first position wherein said first filter portion is positioned under said stream and a second position wherein said second filter portion is positioned under said stream; and causing said stream of liquid to impinge upon said filter such that each filter portion alternatingly absorbs and drains at least a portion of said stream of liquid to cause said body to reciprocate between said first and said second positions.

* * * * *